United States Patent

Brossmer et al.

[19]

[11] Patent Number: 6,023,222

[45] Date of Patent: Feb. 8, 2000

[54] METHOD OF MONITORING A PLURALITY OF CONTROL LOOPS BY REGULATION RATIO MONITORING

[75] Inventors: Max Brossmer; Wolfgang Gehrmann, both of Hanau; Erhard Lehle, Mühlheim; Derrick Straka, Göppingen, all of Germany

[73] Assignees: D.I.E.N.E.S. Apparatebau GmbH, Muhlheim, Germany; Zinser Textilmaschinen GmbH, Ebersbach/Fils, Germany

[21] Appl. No.: 08/945,490

[22] PCT Filed: Feb. 17, 1997

[86] PCT No.: PCT/EP97/00748

§ 371 Date: Oct. 21, 1997

§ 102(e) Date: Oct. 21, 1997

[87] PCT Pub. No.: WO97/31299

PCT Pub. Date: Aug. 28, 1997

[30] Foreign Application Priority Data

Feb. 23, 1996 [DE] Germany .................. 196 06 776

[51] Int. Cl.$^7$ .................................................. G08B 29/00
[52] U.S. Cl. ........................ 340/511; 340/501; 340/514
[58] Field of Search .................................. 340/514, 500, 340/501, 505, 511, 508; 364/141, 139

[56] References Cited

U.S. PATENT DOCUMENTS

4,707,310  11/1987  Debeaud ............................ 264/40.6
5,392,226   2/1995  Hamilton .......................... 364/551.01

*Primary Examiner*—Daryl C. Pope
*Attorney, Agent, or Firm*—Herbert Dubno

[57] ABSTRACT

For monitoring the appropriate operation of a plurality of control loops having the same setpoint, the control ratio is measured at each controller, is normalized and an alarm signal is generated if said normalized control ratio exceeds a predetermined alarm band.

21 Claims, 1 Drawing Sheet

METHOD OF MONITORING A PLURALITY OF CONTROL LOOPS BY REGULATION RATIO MONITORING

CROSS REFERENCE TO RELATED APPLICATION

This application is a national phase of PCT/EP97/00748 filed Feb. 17, 1997 and based upon German National Application 196 06 776.6 filed Feb. 23, 1996 under the International Convention.

FIELD OF THE INVENTION

Our present invention relates to a method of monitoring a plurality of control loops and, in particular, to a method which is applicable to temperature measurement and the measurement of other parameters in textile machines which may have a large number of control loops.

BACKGROUND OF THE INVENTION

The reliability of control systems, in particularly of temperature control loops, essentially depends on the accurate performance of its individual components forming the control loop, such as the actual value sensor, the controller and the final control element. The performance may be monitored e.g. by a second measuring circuit consisting of a second measuring sensor which is connected to an independent monitoring device for the actual value of the controlled quantity. If a permitted limit of the control deviation is exceeded, an alarm routine is generated. Such redundant monitoring systems are commonly in use. However, they are associated with high cost, especially if there is a large number of similar control loops as is the case in controlling the temperature of textile machines like stretch winding machines or stretch twisting machines, where several hundred temperature control points with identical temperature setpoints are provided for each machine.

OBJECT OF THE INVENTION

It is the object of the present invention to provide an improved method of monitoring a plurality of control loops for the purposes described.

SUMMARY OF THE INVENTION

This object is attained, in accordance with the invention in that, during an initial phase, actual values of a controlled quantity of all of the control loops are controlled to a common setpoint and, after reaching a stationary operating condition, respective regulation ratios are measured and stored as are required in each control loop for achieving the common actual value. During a subsequent operating phase, the actual regulation ratio is compared with a stored value and an alarm signal is generated if a regulation ratio deviates from the stored value by more than a predetermined amount.

The invention avoids the high costs of a redundant system with two measuring sensors for each control circuit and nevertheless guarantees a reliable monitoring of the temperature or of another controlled quantity.

The invention monitors the control or regulation ratio of the controller at each controlled system, i.e. it controls the percentage ratio of the actual controller output quantity to the maximum controller output quantity or the permitted maximum controller output quantity, respectively:

$$\text{regulation ratio} = \frac{\text{actual controller output quantity}}{\text{maximum controller output quantity}} \times 100\%$$

In the case of an electrical heater the controller output quantity is the heating power. A signal, which is proportional to the actual controller output quantity and therewith is proportional to the regulation ratio, already exists in the controller. It is the controller output quantity signal at the controller output. Instead of requiring a plurality of additional redundant actual value sensors for the controlled quantity (e.g. temperature), the invention utilizes the already available controller output signal for such monitoring by standardizing the signal to a common level by forming the regulation ratio for all control loops and by thereafter evaluating this regulation ratio signal.

This will be described with reference to the temperature control of a textile machine. However, the method is also useful for controlling in an analogous manner any other physical quantities.

The method is based on the fact that the heating power of a plurality of identical heating devices, like heated rolls or heated plates, must be identical if those heating devices are exposed to the same interference quantities and if the temperatures are identical. If one heating element deviates from its setpoint temperature, then its heating power will also deviate from the heating power of the other heating elements. It can be expected that this heating element is defective or the heater load was changed at this heating element which, e.g. is the case when the heated synthetic yarn is broken.

In temperature controllers the quantity of the control ratio is a measure for the electrical heating energy which is supplied to the heating element. In order to monitor the absolute value of the temperature at each heating element, it is sufficient to prove the identity of the control ratio of the controllers at each heating element. One then can decide whether or not the temperatures of the heating elements are identical and do not change over a longer period of time. The regulation ratio is an internal value of the controller and in a digital controller can easily be sampled periodically and analyzed by means of a supervising computer.

In some cases the actual value of the controlled quantity which is measured by the control sensor and is supplied to the controller, is in fact not the actual value of the quantity itself which is to be maintained or is to be controlled. In a textile machine the critical quantity to be controlled is the surface temperature of the heated roll or heated plate. In particular, in connection with rolls or galettes the surface temperature itself is not measured during operation, but the control sensor is located either inside the shell of the roll (rotating sensor) or it projects into a circular groove of the roll (stationary sensor). Therewith the surface temperature, which is critical for the treatment of the yarn, is not really measured, but a temperature is measured which is more or less proportional to said surface temperature. This measured temperature is fed as the actual value to the controller. Furthermore, the surface temperature may be different at different places of the roll, e.g. at its end portions as contrasted with its central region. The actual value of the temperature as the controlled quantity in a controlled system comprising the galette therefor is not in all cases identical with the actual temperature value as measured by the control sensor, e.g. inside the roll. Even with identical control systems, e.g. heated rolls, this deviation of the actual value is subject to tolerances, e.g. because of tolerances of the control sensors or their location. Also these differences may be taken into account and compensated in accordance with a further improvement of the invention.

DESCRIPTION OF THE PREFERRED EMBODIMENTS

Figure 1:
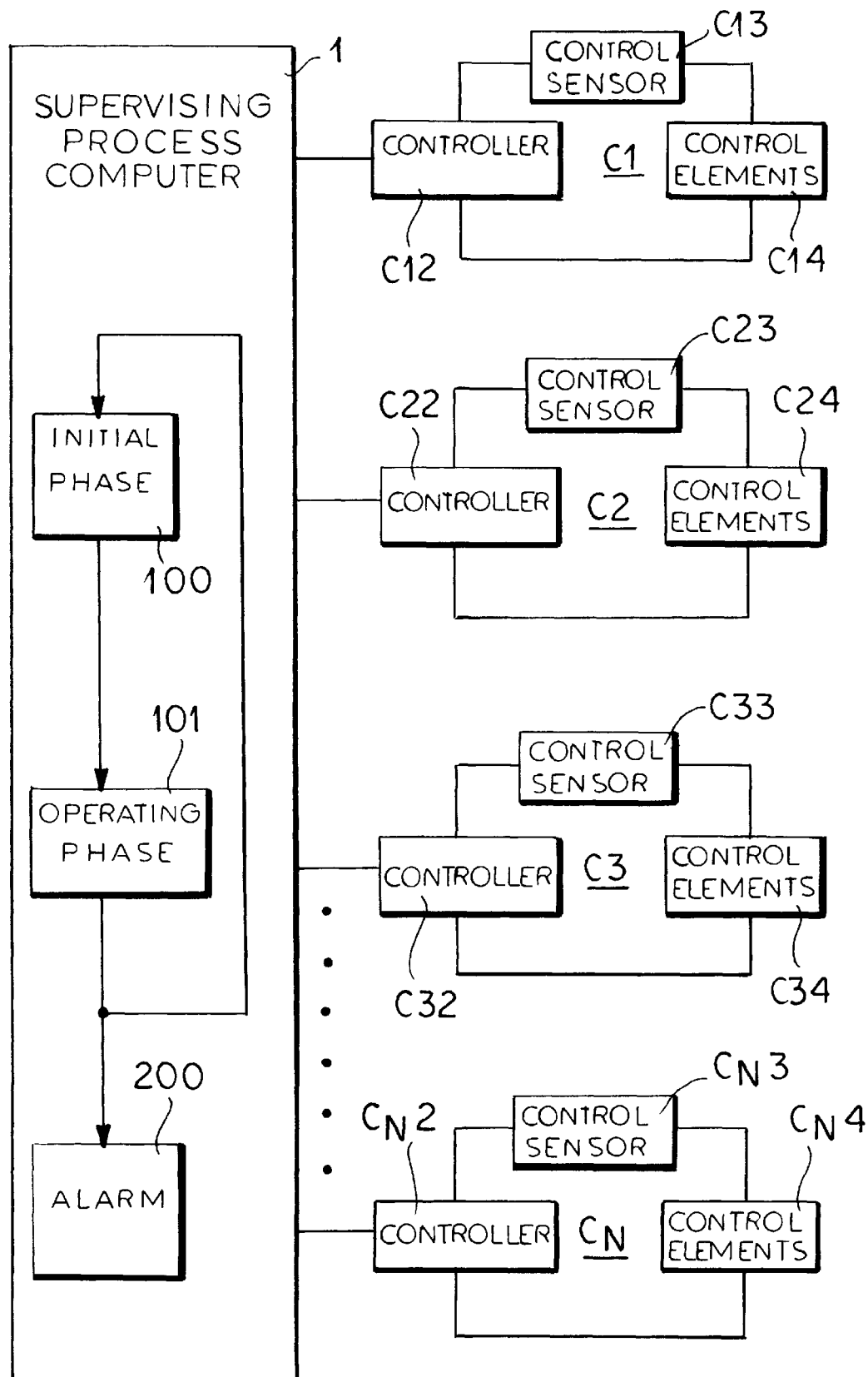
FIG. 1 is a schematic diagram in block form of the components of a plurality of control loops which are monitored by a supervising computer in accordance with monitoring phases of the computer.

As seen in FIG. 1 the method according to the invention is divided into two steps which are separated in time, namely:
a) an initial phase 1, and
b) an operation or production phase 101.

The initial phase is required in order to compensate for all differences of the control signals which are caused by tolerances of the sensors, mechanical tolerances with respect to the positioning of the sensors, tolerances of the installed heating power of the heating elements, tolerances in the number of windings of induction heaters or resistance tolerances of resistor heaters, etc. This is accomplished in accordance with a further improvement of the invention by the following method:
A) Adjusting the Machine during the Initial Phase The method for monitoring the control ratio requires that in an initial phase all the surface temperatures of the same type heaters are adjusted to the same actual value. Similar heaters may be connected together in groups. This adjustment is normally done by the controller C12-CN2 itself when the controller C12-CN2 adjusts the control error to zero. Because of the above-mentioned interference quantities and tolerances, however, differences with respect to the surface temperatures may exist. In order to adjust the surface temperatures, all heating elements are heated and controlled as close as possible to the final operating condition (temperature, speed). As soon as a steady state operating condition is achieved, the surface temperature of each heating element is measured by means of a suitable measuring instrument at the same position of the heater. This temperature in most cases as mentioned above will not exactly correspond to the setpoint temperature which is preset commonly for similar control elements C14-CN4. This results from the above-mentioned tolerance differences from one heating element to another heating element. This measurement is made only once during the initial phase. The measuring value is supplied manually or via a data bus to a supervising process computer 1. This computer derives from these measuring values a first temperature mean value:

$$\bar{x}_1 = \frac{1}{n} \sum_{i=1}^{i=n} x_i \tag{1}$$

$\bar{x}_1$=first mean value of the acutal values of all control elements;
n=number of the control elements C14-CN4;
$x_i$=actual value of the i.th control element.

All measured temperature values then are compared with this first medium value $\bar{x}_i$.

$$\Delta x_{1i} = \bar{x}_1 - x_i \tag{2}$$

In this connection there might be measuring points having a deviation which lies outside a predetermined limit. Such measuring points or control circuits $x_i$'s let one assume that this is a defective control element C14-CN4. A computer 1 will mark those defective control points and will not use them when calculating a second average value:

$$\bar{x}_2 = \frac{1}{n-n'} \sum_{i=1}^{i=n} x_i \text{ for all } x_i \neq x'_i \tag{3}$$

$\bar{x}_2$=second improved mean value of the temperature actual values
n'=order number of the marked control element C14-CN4
$x'_i$=actual value of the i.th marked control element.

The computer 1 determines the deviation between the improved second temperature mean value and the measured value:

$$\Delta x_{2i} = \bar{x}_2 - x_i \tag{4}$$

$\Delta x_{2i}$=temperature correction value (trimming value) of the i.th control element C14-CN4.

The computer 1 then will add or subtract this value to/from the actual value of the control sensor. Therewith a corrected (trimmed) control sensor C13-CN3 value:

$$\hat{x}_{2i} = x_i \pm \Delta x_{2i} \tag{5}$$

$\hat{x}_{2i}$=corrected (trimmed) actual value of the i.th control element C14-CN4 is supplied to the controller C12-CN2 which trimmed control sensor value compensates for the described tolerances of the measuring sensor. After some adjusting time, the temperature at the heater surface in spite of those tolerances will be the same from one heating element to another heating element and will correspond to the improved second temperature mean value $\bar{x}_2$.

The heating power and therewith the control ratios of the controllers therefore should also be identical. However, this in most cases will not be so, because tolerances of the final control elements (induction heater or resistance heater) and different main voltages or different environmental conditions may cause deviating control or regulation ratios.

For this reason a control ratio correction number is determined in accordance with an improvement of the invention. For this purpose a process computer samples the control or regulation ratios of all control elements C14-CN4 which belong to the same control ratio group. Combined into one control ratio group are normally all heaters which are operated with the same temperature setpoint. However, there might be other criteria for grouping, such as a connection to the same phase line of the mains. A computer then from those control ratios determines a first arithmetic mean value:

$$\bar{y}_1 = \frac{1}{n} \sum_{i=1}^{i=n} y_i \tag{6}$$

$\bar{y}_1$=first mean value of the control ratios;
$y_i$=control ratio of the i.th control element.

All control ratios of this group are compared with this first mean value:

$$\Delta y_{1i} = \bar{y}_1 - y_i \tag{7}$$

It may happen that some control ratios y'i strongly deviate from this first calculated mean value because of an exceptionally high control ratio error or a yarn break. The defective component may be replaced.

In any case the computer 1 will not take into account those heating elements when calculating, by means of a second averaging procedure, a second improved mean value of the control ratio:

$$\bar{y}_2 = \frac{1}{n-n'} \sum_{i=1}^{i=n} y_i \text{ for all } y_i \neq y_i' \quad (7)$$

$\bar{y}_2$=second improved control ratio—mean value;

$y'_i$=marked control ratio of the i.th control element C14-Cn4;

n'=order number of the marked i.th control element C14-CN4.

The computer 1 then compares the control ratios of all control elements with said improved second mean value of the control ratio.

The deviation of the control or regulation ratios:

$$\Delta y_{2i} = \bar{y}_2 - y_i \quad (9).$$

from this improved second mean value of the control ratio can be added to the respective actual control ratios:

$$\hat{y}_i = y_i \pm \Delta y_{2i} \quad (10)$$

$\hat{y}_i$=corrected control signal of the i.th control element C14-CN4;

$\Delta y_{2i}$=corrected value of the control ratio of the i.th control element C14-CN4.

Therewith corrected controller output signals or control signals $\hat{y}_1$ are generated corresponding to the improved second mean value of the control ratio as long as there is no temperature error in the control loop C1-CN.

These correcting values for the control ratios are stored within the computer 1 for use in the monitoring phase during the normal production operation for deriving a corrected control ratio.

An alternative method does not calculate the correction value of the control ratio during the initial phase. This means that in this case an individual alarm band for the control ratio, i.e. a permitted fluctuation range of the control ratio, will be associated with each heater of a group.

B) Monitorimg the Control Signal during Operation

After tuning the machine during the initializing phase, now the amount and the identity of the control ratios of all control elements can be monitored during the production phase by means of the computer 1 and therewith the amount and the identity of the heater temperatures of all control elements C14-CN4 are monitored.

For this purpose the computer 1 samples in regular time intervals T the actual control ratio of all controllers. Added to each control ratio $y_{Ti}$ is the associated correction value as determined during the initial phase.

$$\hat{y}_{Ti} = y_{Ti} \pm \Delta y_{2i} \quad (11)$$

$\hat{y}_{Ti}$=corrected control of regulation ratio of the i.th control element C14-C4 during time period T;

$y_{Ti}$=uncorrected control or regulation ratio of the i.th control element C14-C4 during time period T.

From this corrected regulation ratio $\hat{y}_{Ti}$ a first mean value is derived:

$$\bar{y}_{1T} = \frac{1}{n} \sum_{i=1}^{i=n} \hat{y}_{Ti} \quad (12)$$

$\bar{y}_{1T}$=first control ratio—mean value at sample time T.

Each regulation ratio is divided by said mean value therewith generating a normalized control ratio:

$$\tilde{y}_{1Ti} = \frac{\hat{y}_{Ti}}{\bar{y}_{1T}} \quad (13)$$

$\tilde{y}_{1Ti}$=first normalized regulation ratio of the i.th control element at time T $\hat{y}_{Ti}$=corrected regulation ratio of the i.th control element at sample time T $\bar{y}_{1T}$=first mean value of the regulation ratio at the sample time.

The normalization of the regulationratio is useful, since the regulation ratios may change because of long time fluctuations of the environmental conditions or of the machine frame so that also the calculated mean value may change about the same procentage value. However, this means that the absolute value of the control ratio may change, but the normalized value will not change because the calculated mean value will also change by the same amount. The normalized value in all cases will be a value in the order of one.

Each normalized control ratio now is evaluated whether or not it lies within an alarm range about said value 1, e.g. 0,09<alarm band>1,01. Values lying outside this alarm band will be marked and will not be used for an improved second averaging operation:

$$\bar{y}_{2T} = \frac{1}{n-n'} \sum_{i=1}^{i=n} \hat{y}_{Ti} \text{ for all } \hat{y}_i \neq \hat{y}'_{Ti} \quad (14)$$

$\bar{y}_{2T}$=second improved control ratio mean value at sample time T $\hat{y}'_{Ti}$=marked (corrected) control ratio of the i.th control element C14-CN4 at sample time.

Therewith at the actual time a suitable scale for comparing the regulation ratios for each heater group is formed which is not falsified because of a defective heating element.

All control ratios will be normalized by said second improved mean value $\bar{y}_{2T}$. Therewith the formed normalized control ratios $\tilde{y}2_{Ti}$ have a value of one if there is no temperature error. By comparing with a control ratio alarm band of e.g. 0,99<alarm band>1,01, it can be determined which of the control ratios and therewith which of the control loops C1-CN lies outside the alarm band and therefore presumably has a temperature error. If normalized control ratios lie outside this alarm band, an alarm 200 is initiated.

Another type of control ratio alarming provides that the correction value of the control ratio as determined during the initial phase is not added to or subtracted from the periodically determined control ratios. In this case an individual alarm band of e.g. 0,96<alarm band>0,98, must be associated with each normalized control ratio $\tilde{y}_{2Ti}$ of each heater. The determination of the control ratio correction values during the initial phase then can be omitted. During standstill of the machine, a plurality of non-critical errors may appear because of the non-linear conditions. For this reason the alarm system is switched-off during this period of time and is switched-on not earlier than when the machine has again achieved the stationary production condition.

A false alarm may also appear if a thread breaks at a heating element. In this case the control ratio alarm is suppressed. The presence of a thread is monitored by a thread-monitoring device which informs the temperature controller accordingly. A broken thread causes a sudden change of the control ratio. This sudden change can be used to touch-free monitor for broken threads.

The described method can be improved by combining heating elements with identical perating conditions into groups for generating said mean values. Therewith the selectivity of the regulation ratio monitoring method is improved. Possible criteria for the combining of heaters into a group are the following ordered with respect to their importance:

Same type of heater with same temperature setpoint

Heaters which are exposed locally to similar environmental influences

Heaters connected to the same phase line of a three-phase mains network.

The forming of groups is freely selectable in accordance with said three criteria.

The invention cannot only be used for temperature controllers and also not only for textile machines, but can be applied wherever several control systems have the same setpoint and the control ratio is a measure of the energy supplied to the controlled system. This e.g. might be the pressure in several treatment chambers or tubes, the flow through several supply or drain lines, the relative humidity in chambers or products, or each other controllable physical quantity.

We claim:

1. A method for monitoring a plurality of control loops, with each control loop comprising a control sensor, a controller, and a controlled system, and with all loops having identical setpoint values of the controlled quantity; said method comprising the following steps:
   a) during an initial phase
      a1) the actual value of the controlled quantity in each controlled system is measured by an adjustment sensor and is controlled by said controller to said common setpoint;
      a2) a first mean value is derived from the values of the controlled quantity as measured by said adjustment sensor at the various controlled systems, and this first mean value is for each control point compared with the controlled quantity as measured there by said adjustment sensor;
      a3) the therewith determined errors of the actual value at the individual control points are compared with a predetermined limit;
      a4) during the subsequent calculation of an improved second mean value, those control points with a control error exceeding said limit remain unused;
      a5) the actual value of the controlled quantity in each of the control systems is controlled to said common setpoint by adding a correction value to the actual value as measured by said control sensor;
      a6) after reaching a stationary operating condition, a regulation ratio of each controller is determined in the form of the ratio of the actual value of the controlled quantity divided by a predetermined maximum value of said controlled quantity; and
      a7) for each control loop said regulation ratio is stored in a memory;
   b) for additionally monitoring the operation of said control loops during a subsequent operating phase
      b1) for each control loop the actual regulation ratio is compared with the value of said stored regulation ratio; and
      b2) an alarm signal is generated if an actual regulation ratio deviates from said stored value by more than a predetermined amount.

2. The method of claim 1, wherein during said initial phase the value of the controlled quantity as measured by the adjustment sensor is at each control point compared with said improved second mean value; and from the difference between the actual value and said second mean value a correction value is derived, by which the actual value of the controlled quantity, as measured by the control sensor during the subsequent operating phase, is corrected in order to achieve the same actual value of the controlled quantity at all non-defective control points.

3. The method of claim 2, wherein, for determining the said correction value, the value of the controlled quantity as measured by said adjustment sensor at each control point is supplied to a supervising control computer via a data bus.

4. The method of claim 1, wherein during the initial phase after correcting the actual value of the controlled quantity, the regulation ratio of each controller and therewith the actual value of its controlled quantity is sampled by a supervising computer, and by adding a correction value to or subtracting a correction value from said regulation ratio, all control points will not only have the same actual value of the controlled quantity, but also will receive the same corrected control signals.

5. The method of claim 1, wherein during the operating phase
   a) the regulation ratios of the individual control points are sampled and normalized by calculating a first mean value from the regulation ratios of all control points of a group,
   b) all regulation ratios are compared with said first mean value;
   c) those regulation ratios are marked which lie outside a predetermined limit;
   d) an improved second mean value of the regulation ratios is formed which disregards those marked regulation ratios;
   e) the regulation ratios are normalized by dividing them by the improved second mean value; and
   f) an alarm band is associated with the normalized regulation ratio of each control point and an alarm signal is generated, if a normalized regulation ratio exceeds said alarm band.

6. The method of claim 5, wherein said alarm band is provided non-symmetrically with respect to the value 1.

7. The method of claim 1, characterized in that in case of heavy changes of machine parameters such as speed or temperature setpoint, the regulation ratio monitoring system is switched-off in order to avoid non-justified false alarms.

8. The method of claim 1 when applied to a yarn treating machine, characterized in that in case of a yarn break at a heating element, regulation ratio monitoring of this heating element is switched-off.

9. The method of claim 8, characterized in that a sudden change of the regulation ratio is indicated a yarn break signal.

10. The method of claim 1 when used for controlling temperatures in a yarn treating machine, characterized in that in case of changing the setpoint temperature or the machine speed setpoint, those correction values for temperature and regulation ratio which were calculated during the initial phase, are multiplied with a correction coefficient, in order to compensate any non-linearity of the correction values at least in a first approximation, so that even in the case of heavy changes of temperature setpoint and/or machine speed, no new initializing is required.

11. A method for monitoring a plurality of control loops, with each control loop comprising a control sensor, a controller, and a controlled system, and with all control loops having identical setpoint values of the controlled quantity, said method comprising the following steps:
   a) during an initial phase
      a1) the actual value of the controlled quantity in each controlled system is measured by an adjustment sensor and is controlled by said controller to said common setpoint;
      a2) after reaching a stationary operating condition, a regulation ratio of each controller is determined in the form of the ratio of the actual value of the controlled quantity divided by a predetermined maximum value of said controlled quantity;
      a3) from the regulation ratios of all control points of a group a first mean value is calculated;
      a4) all regulation ratios are compared with said first mean value;
      a5) those regulation ratios are marked which lie outside a predetermined limit;
      a6) an improved second mean value of the regulation ratios is formed which leaves said marked regulation ratios unused;
      a7) the regulation ratios are normalized by dividing them by said improved second mean value;
      a8) for each control loop a normalized regulation ratio is stored in a memory;
   b) for additionally monitoring the operation of said control loops during a subsequent operating phase
      b1) for each control loop the actual regulation ratio is compared with the value of said stored normalized regulation ratio;
      b2) an alarm signal is generated if an actual regulation ratio deviates from said stored value by more than a predetermined amount.

12. The method of claim 11, wherein during the operating phase the calculation of the deviation of the corrected and normalized regulation ratios from a regulation ratio mean value is accomplished at predetermined time intervals, and an alarm signal is generated if said deviation of the normalized regulation ratio of a control point exceeds a predetermined alarm band around the value 1.

13. The method of claim 11, wherein during the initial phase after correcting the actual value of the controlled quantity, the regulation ratio of each controller and therewith the actual value of its controlled quantity is sampled by a supervising computer, and by adding a correction value to or subtracting a correction value from said regulation ratio, all control points will not only have the same actual value of the controlled quantity, but also will receive the same corrected control signals.

14. The method of claim 11, wherein during the initial phase
   a) for calculating a mean value of the regulation ratios a first mean value is calculated from the regulating ratios of all control points of a group;
   b) all these regulation ratios are compared with said first mean value;
   c) those regulation ratios are marked which lie outside a predetermined limit;
   d) an improved second mean value of the regulation ratios is formed which leaves said marked regulations ratios unused.

15. The method of claim 11, characterized in that in case of heavy changes of machine parameters such as speed or temperature setpoint, the regulation ratio monitoring system is switched-off in order to avoid non-justified false alarms.

16. The method of claim 11 when applied to a yarn treating machine, characterized in that in case of a yarn break at a heating element, regulation ratio monitoring of this heating element is switched-off.

17. The method of claim 16, characterized in that a sudden change of the regulation ratio is indicated as a yarn break signal.

18. The method of claim 11 when used for controlling temperatures in a yarn treating machine, characterized in that in case of changing the setpoint temperature or the machine speed setpoint, those correction values for temperature and regulation ratio which were calculated during the initial phase, are multiplied with a correction coefficient, in order to compensate any non-linearity of the correction values at least in a first approximation, so that even in the case of heavy changes of temperature setpoint and/or machine speed, no new initializing is required.

19. The method of claim 11, wherein during the operating phase
   a) the regulation ratios of the individual control points are sampled and normalized by calculating a first mean value from the regulation ratios of all control points of a group;
   b) all regulation ratios are compared with said first mean value;
   c) those regulation values are marked which lie outside a predetermined limit;
   d) an improved second mean value of the regulation ratios is formed which leaves those marked regulation ratios unused;
   e) the regulation ratios are normalized by dividing them by the improved second mean value; and
   f) an alarm band is associated with the normalized regulation ratio of each control point and an alarm signal is generated, if a normalized regulation ratio exceeds said alarm band.

20. The method of claim 19, characterized in that said alarm band is provided nonsymmetrically with respect to the value 1.

21. A method for monitoring a plurality of control loops, with each control loop comprising a control sensor, a controller, and a controlled system, and with all control loops having identical setpoint values of the controlled quantity; said method comprising the steps of:
   a) during an initial phase
      the actual value of the controlled quantity in each controlled system is measured by an adjustment sensor;

said actual value of the controlled quantity in each control system is controlled by its controller to said common setpoint;

after reaching a stationary operating condition, a regulation ratio of each controller is determined in the form of the ratio of the actual value of the controlled quantity divided by a predetermined maximum value of said controlled quantity; and for each control loop said regulation ratio is stored in a memory;

b) for additionally monitoring the operation of said control loops during a subsequent operating phase for each control loop the actual regulation ratio is compared with the value of said stored regulation ratio; and an alarm signal is generated if an actual regulation ratio deviates from said stored value by more than a predetermined amount.

* * * * *